United States Patent [19]

Parker

[11] Patent Number: 4,645,157

[45] Date of Patent: Feb. 24, 1987

[54] BEVERAGE HOLDER FOR VEHICLE

[75] Inventor: Barry R. Parker, Lansing, Mich.

[73] Assignee: General Motors Corporation, Detroit, Mich.

[21] Appl. No.: 812,389

[22] Filed: Dec. 23, 1985

[51] Int. Cl.⁴ .............................................. A47K 1/09
[52] U.S. Cl. ................................ 248/311.2; 248/277; 248/293
[58] Field of Search ...................... 248/311.2, 310, 277, 248/312, 312.1, 313, 293, 309.1, 316.5, 231.9; 211/105; 296/152

[56] References Cited

U.S. PATENT DOCUMENTS

| 924,348 | 6/1909 | Green | 248/312 |
|---|---|---|---|
| 1,201,411 | 10/1916 | Williams | 248/312 |
| 1,222,086 | 4/1917 | Erickson | 248/312 |
| 1,379,700 | 5/1921 | Scheu | 248/277 |
| 1,644,665 | 10/1927 | Beck | 248/310 |
| 1,841,278 | 1/1932 | Dallas | 248/277 |
| 2,255,461 | 9/1941 | Williams | 211/105 |

FOREIGN PATENT DOCUMENTS

| 750760 | 12/1944 | Fed. Rep. of Germany | 248/310 |
|---|---|---|---|
| 21978 | of 1900 | United Kingdom | 248/311.2 |

OTHER PUBLICATIONS

Mechanisms in Modern Engineering Design, vol. II, Lever Mechanisms, Ivan I. Artobolevsky.

Primary Examiner—Reinaldo P. Machado
Assistant Examiner—Alvin Chin-Shue
Attorney, Agent, or Firm—Charles E. Leahy

[57] ABSTRACT

A beverage holder is mounted on the vehicle body above an armrest or other horizontal planar surface upon which a beverage container may be placed by the vehicle occupant. First and second projection links have central portions pivoted together and inner ends pivotally mounted within a housing by a pin and slot slider mechanism so that the inner ends are movable toward one another by which they are projected outwardly from the housing to overlie the planar surface and away from each other by which they are retracted into the housing. First and second connector links have first ends pivotally connected to each other and second ends pivotally connected to the outer ends of the first and second projection links so that the projection links and the connector links cooperate to define a parallelogram which opens as the projection links are extended from the housing to thereby define a receptacle for receiving the beverage container. A spring acts between the inner ends of the first and second projection links to pull the inner ends to the closest together position. The holder is moved to the retracted position by pushing the connector links into the housing so that the pivotal connection between the first and second connector links goes overcenter and the bias of the spring pulling the projection link inner ends together acts to urge the links toward the retracted position whereby the holder is retained in the retracted position within the housing.

4 Claims, 4 Drawing Figures

BEVERAGE HOLDER FOR VEHICLE

The invention relates to a holder for holding a beverage container on a planar support surface of a vehicle body and more particularly to a beverage holder which retracts into a housing when not in use.

BACKGROUND OF THE INVENTION

Occupants of motor vehicles frequently place beverage containers such as coffee cups and soft drink cans on a horizontal surface such as the armrest, console or the instrument panel. However, if the vehicle corners or decelerates, the beverage container slides on the surface and may be spilled. Accordingly, it is well known to provide a circular depression in the horizontal surface to retain the beverage container against sliding. A disadvantage of such a circular depression is that it may be visually displeasing, especially when condensation or spillage from the container collects in the depression and becomes mixed with dust and dirt which also tends to collect in the depression.

Thus, it would be desirable to provide a means for holding a beverage container on a vehicle body surface without requiring a depression and which would be visually unobtrusive and not collect dirt and moisture.

SUMMARY OF THE INVENTION

According to the invention, a retractable beverage holder is installed within a housing recessed into the vehicle body above a horizontal planar surface upon which a beverage container may be placed by the vehicle occupant. The retractable holder includes first and second projection links having central portions pivoted together and inner ends which are pivotally mounted within the housing by a pin and slot slider mechanism so that the inner ends of the first and second links are movable toward one another by which they are projected outwardly from the housing to overlie the planar surface and away from each other by which they are retracted into the housing. First and second connector links have first ends pivotally connected to each other and second ends respectively pivotally connected to the outer ends of the first and second projection links so that the projection links and the connector links cooperate to define a parallelogram which opens as the projector links are extended from the housing to thereby define a receptacle for receiving the beverage container. A spring acts between the inner ends of the first and second projection links to pull the inner ends to the closest together position in which the projection links extend from the housing end and open the parallelogram for support of the beverage container. The beverage holder is moved to the retracted position by pushing the connector links into the housing so that the pivotal connection between the first and second connector links goes overcenter with respect to the pivotal connection between the connector links and the projection links and the bias of the spring acting to pull the projection link inner ends together acts through the links to urge the pivotal connection between the connector links toward the retracted position whereby the beverage container holder is retained in the retracted position within the housing.

Accordingly, the object, feature and advantage of the invention resides in the provision of a slider crank projector mechanism retractably housed within a wall of the vehicle body above a planar surface and being extendable from the housing to define a parallelogram receptacle receiving a beverage container to support the beverage container against movement on the planar support surface.

A further object, feature and advantage of the invention resides in the provision of a retractable beverage holder comprising a slider projection mechanism having associated spring means acting to urge the mechanism to project from the housing and further comprising the projector linkage having connector links going overcenter with respect to the projection links by which the same spring maintains the mechanism in the retracted position.

BRIEF DESCRIPTION OF THE DRAWINGS

These and other features, objects and advantages of the invention will become apparent upon consideration of the description of the preferred embodiment and the appended drawings in which.

DESCRIPTION OF THE PREFERRED EMBODIMENT

Figure 1:
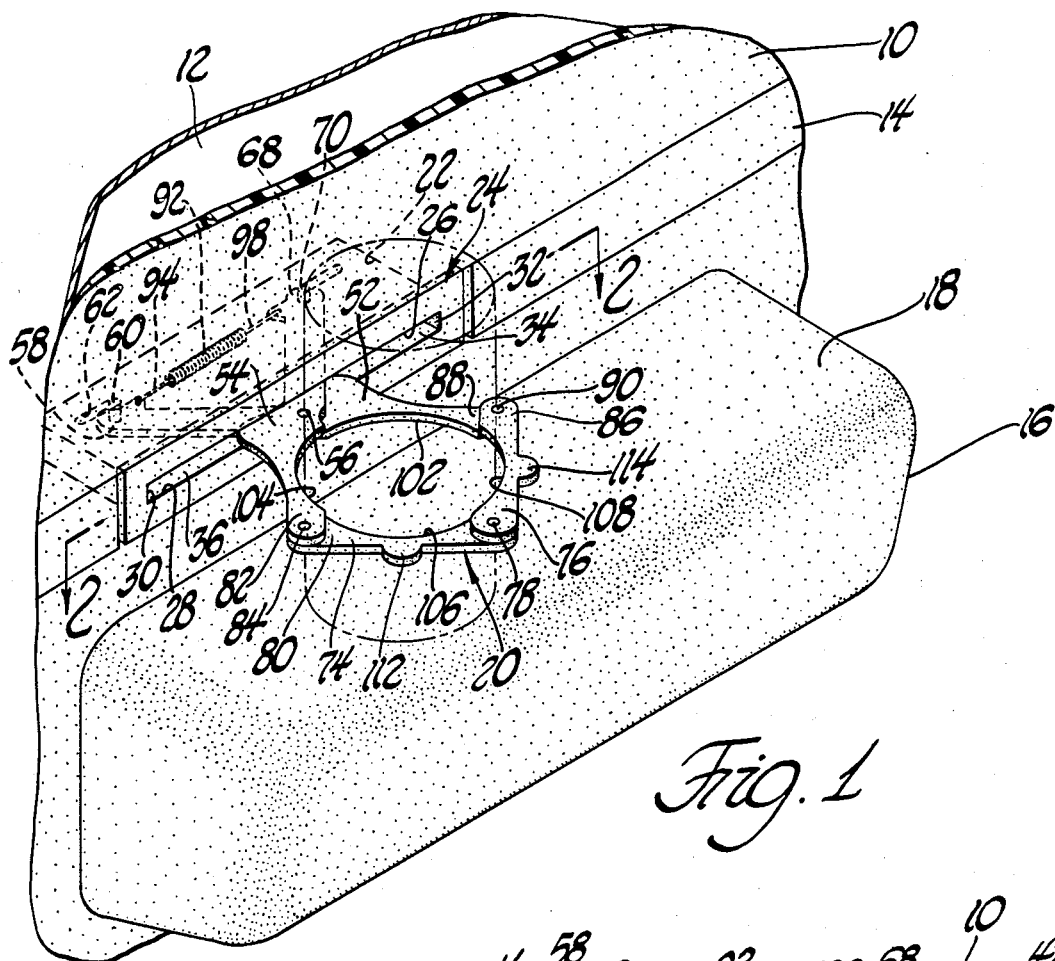
FIG. 1 is a perspective view of a vehicle body showing the beverage holder extended from its housing and overlying a planar support surface to support a phantom line indicated beverage container.

FIG. 1 shows a portion of a vehicle body door 10 including a metal panel 12 and a trim panel 14. An armrest 16 is mounted on the vehicle door 10. The armrest 16 includes a generally horizontal planar support surface 18 upon which a vehicle occupant may wish to place a beverage container, such as a coffee cup or a phantom line indicated soft drink can.

Figure 2:
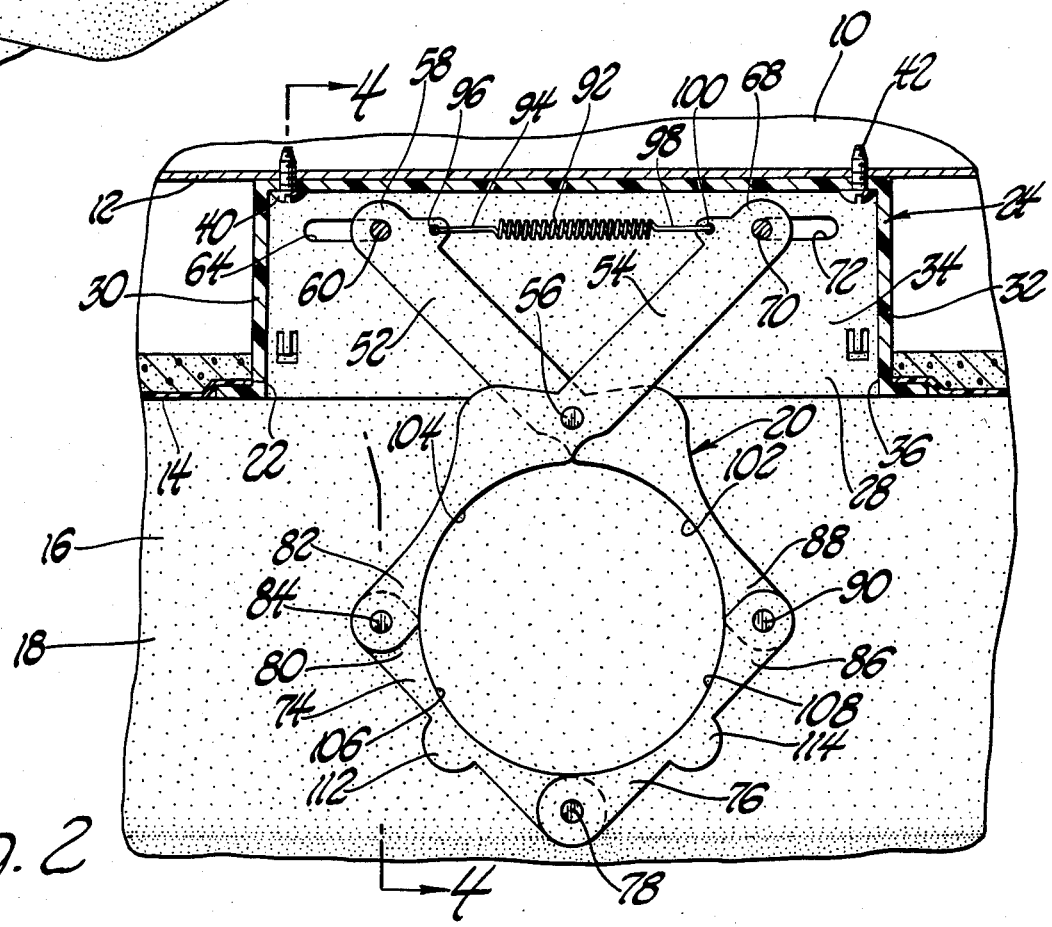
FIG. 2 is a sectional view taken in the direction of arrows 2—2 of FIG. 1.
Figure 4:
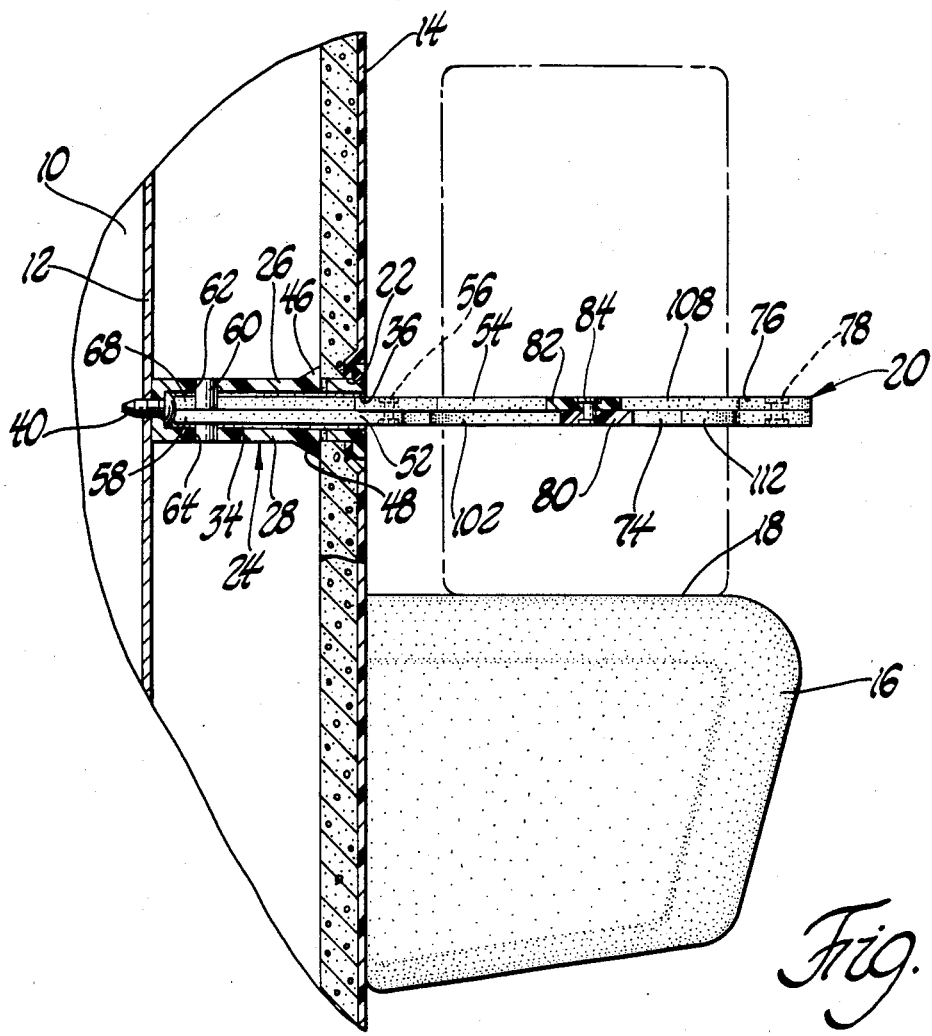
FIG. 4 is a side elevation view of the mechanism having parts broken away and in section.

A beverage holder mechanism, generally indicated at 20, is provided for holding the beverage container against sliding movement on the planar support surface 18. As best seen in FIGS. 1, 2 and 4, the beverage holder 20 includes a molded plastic housing 24 which is recessed into a slot 22 in the door trim panel 14. In particular, the housing 24 includes an upper wall 26, and a lower wall 28 and end walls 30 and 32 which cooperate to define a storage cavity 34 which communicates with the vehicle passenger compartment by a slot 36. The housing 24 is mounted on the metal panel 12 of the door by a pair of screws 40 and 42. Additionally, the housing 24 is retained by a pair of integral snap tabs 46 and 48 which are respectively integral with the top wall 26 and bottom wall 28 and mounted on flexure fingers integral therewith. Upon insertion of the housing 24 through the slot 22 of the trim panel 14 the snap retainers flex into the storage cavity 34 but then return to the positions of FIG. 4 in which they retain the housing 24 with respect to the trim panel 14.

The beverage holder also includes a first projection link 52 and a second projection link 54 which are preferably of molded plastic and are pivotally connected together at approximately their mid-points by a pivot pin 56. The projection link 52 has an inner end 58 which carries a pin 60. The pin 60 projects upwardly and downwardly from the link 52 and slides within a slot 62 provided in the upper wall 26 and a slot 64 provided in the lower wall 28. Likewise, the projection link 54 has an inner end 68 which carries a pin 70 projecting upwardly into a slot, not shown, in the upper wall 26 and downwardly into a slot 72 in the lower wall 28.

The beverage holder 20 also includes a first connector link 74 and a second connector link 76 having outer ends which are pivotally connected together by the pivot pins 78. The connector link 74 has an inner end 80 which is pivotally connected to an outer end 82 of the projection link 54 by a pivot pin 84. Likewise, the connector link 76 has an inner end 86 which is pivotally connected to an outer end 88 of the projection link 52 by a pivot pin 90. As best seen in FIG. 2, the connector links 74 and 76 cooperate with those portions of the projection links 52 and 54 outboard of the pivot pin 56 to define a parallelogram linkage.

A coil tension spring 92 has one end 94 hooked in a hole 96 in the inner end 58 of the projection link 52 and a second end 98 hooked into a hole 100 in the inner end 68 of the projection link 54. Accordingly, the coil tension spring 92 acts to urge the inner ends of the projection links 52 and 54 to slide along their respective slots in the housing 24 to their relatively closest together positions of FIG. 2 so that the links are projected and held at the outwardly most extended positions of FIG. 2. As seen in FIG. 2, it is desirable that the projection links 52 and 54 and the connector links 74 and 76 have their respective inner surfaces 102, 104, 106 and 108 curved to define a circle which mates with the typical coffee cup and beverage can. Furthermore, as seen in FIG. 2, it is desirable that the lengths of the links be configured so that the distance between the pivot pins 56, 84, 78 and 90 are equal distances so that the parallelogram formed by the links is actually a rhombus. Furthermore, as best seen in FIG. 2, it is desirable that the distance between these pivots be interrelated with the lengths of the projection arms 52 and 54 and with the closest together positions of the inner ends of the projection links in a manner by which the extended position of the links shown in FIG. 2 provides a rhombus which is a square.

Figure 3:
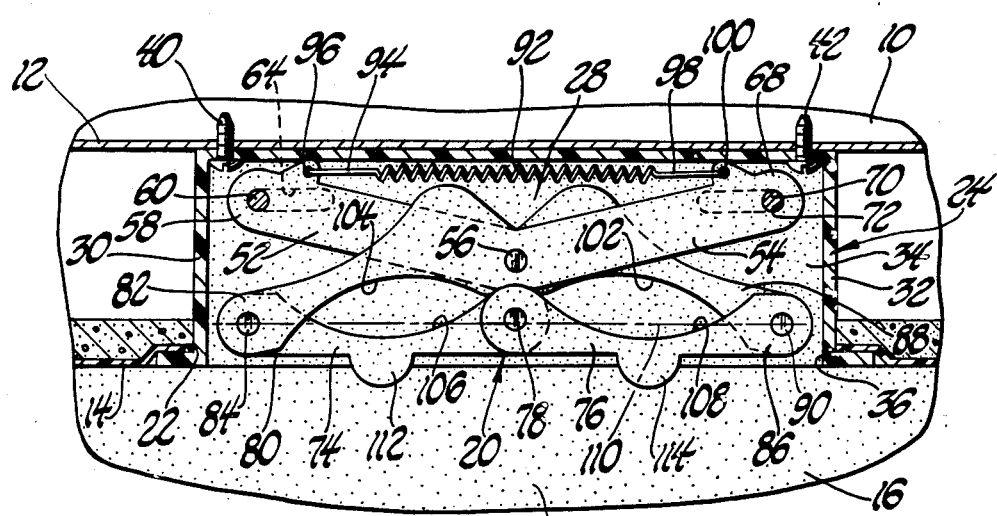
FIG. 3 is a view similar to FIG. 2 but showing the retractable holder stored in its retracted position within the housing.

As best seen in FIG. 3, the beverage holder may be retracted within the housing 24. Such retraction of the linkage is obtained by the seat occupant merely using his hand to push the outermost ends of the connector links and projection links toward the trim panel 14 and into the housing 24. As best seen in FIG. 3, the inward retracting movement of the links is permitted by the movement of the inner ends 58 and 68 of the projection links 52 and 54 away from each other along the slots in the housing upper and lower walls as permitted by yielding of the tension spring 92. As best seen in FIG. 3, the pivot pin 78 goes overcenter with respect to a phantom indicated line 110 drawn through the pivot pins 84 and 90. Thus, although the coil tension spring 92 is acting on the inner ends of the projection links 52 and 54 in the direction which would urge the projection links outwardly of the housing, the actual effect of this spring is translated into the connector links 74 and 76 and urges the pivot pin 78 inwardly into engagement with the center portions of the projection links 52 and 54 adjacent to the pivot pin 56 so that the entire linkage is in fact retained in its retracted position within the storage space 34 defined by the housing 24.

A pair of finger grips 112 and 114 are provided integrally with the connector links 74 and 76 so that the occupant can easily grip the linkage to pull the connector links 74 and 76 outwardly to the extended position.

As soon as the pivot pin 78 goes back overcenter with respect to the line 110 drawn through the pivots 84 and 90, the tension spring 92 will work to project the linkage outwardly of the housing.

As best seen in FIG. 4, the beverage holder of this invention is mounted on the door in spaced relation above the planar support surface 18 of the armrest 16. The spacing may be varied as desirable but would preferably be about one-third to one-half of the height of the conventional coffee cup and beverage can.

It will be understood that the retractable beverage holder of this invention could be mounted on the vehicle console or on the dashboard. Furthermore, the invention could be conveniently used in other types of vehicles such as vans or buses.

Thus, it is seen that the invention provides a new and improved beverage holder for a motor vehicle which is effective to retain the beverage container against sliding movement on a vehicle body surface.

The embodiments of the invention in which an exclusive property or privilege is claimed are defined as follows:

1. In a motor vehicle body having a planar surface adapted to support a beverage container, a retractable holder for holding the beverage container on the planar surface comprising:
   first and second projection links having inner ends, outer ends, and central portions;
   pivot means connecting the central portions of the first and second projection links;
   first and second connector links having first ends pivotally connected to each other and second ends respectively pivotally connected to the outer ends of the first and second projection links whereby the projection links cooperate with the connector links to define a parallelogram;
   a housing mounted on the vehicle body above the planar surface;
   means pivotally mounting the inner ends of the first and second projection links on the housing in spaced apart relation and defining a path of limited movement of at least one of the inner ends toward and away from the other between a furthest spaced apart position in which the parallelogram is collapsed and the links stored within the housing and a closest together position in which the links are extended from the housing and the parallelogram is opened to define a receptacle for receiving the beverage container and holding the container on the planar surface.

2. In a motor vehicle body having a planar surface adapted to support a beverage container, a retractable holder for holding the beverage container on the planar surface comprising:
   first and second projection links having inner ends, outer ends, and central portions;
   pivot means connecting the central portions of the first and second projection links;
   first and second connector links having first ends pivotally connected to each other and second ends respectively pivotally connected to the outer ends of the first and second projection links whereby the projection links cooperate with the connector links to define a parallelogram;
   a housing mounted on the vehicle body above the planar surface and having upper and lower walls defining a storage cavity having a horizontal opening slot;

pin and slot means acting between the inner ends of the first and second projection links and the housing to pivotally mount the projection link inner ends in spaced apart relation and define a path of limited movement of the inner ends toward and away from one another between a furthest spaced apart position in which the parallelogram is collapsed and the links stored within the housing and a closest together position in which the links are extended from the housing and the parallelogram is opened to define a receptacle for receiving the beverage container and holding the container on the planar surface.

3. In a motor vehicle body having a planar surface adapted to support a beverage container, a retractable holder for holding the beverage container on the planar surface comprising:

first and second projection links having inner ends, outer ends, and central portions;

pivot means connecting the central portions of the first and second projection links;

first and second connector links having first ends pivotally connected to each other and second ends respectively pivotally connected to the outer ends of the first and second projection links whereby the projection links cooperate with the connector links to define a parallelogram having a central opening for receiving the beverage container;

a housing mounted on the vehicle body above the planar surface and having upper and lower walls defining a storage cavity having a horizontal opening slot;

pin and slot means acting between the inner ends of the first and second projection links and the housing to pivotally mount the projection link inner ends in spaced apart relation and define a path of limited movement of the inner ends toward and away from one another between a furthest spaced apart position in which the parallelogram is collapsed and the links stored within the housing and a closest together position in which the links are extended from the housing and the parallelogram is opened to define a receptacle for receiving the beverage container and holding the container on the planar surface; and the length of the links and the spacing of said pivots acting therebetween being such that the parallelogram is an equilateral parallelogram and the open position of the parallelogram is a right angle equilateral parallelogram.

4. In a motor vehicle body having a planar surface adapted to support a beverage container, a retractable holder for holding the beverage container on the planar surface comprising:

first and second projection links having inner ends, outer ends, and central portions;

pivot means connecting the central portions of the first and second projection links to one another to define a scissors;

first and second connector links having first ends pivotally connected to each other and second ends respectively pivotally connected to the outer ends of the first and second projection links whereby the projection links cooperate with the connector links to define a parallelogram at the end of the scissors;

a housing mounted on the vehicle body above the planar surface;

means pivotally mounting the inner ends of the first and second projection links on the housing in spaced apart relation and defining a path of limited movement of the inner ends toward and away from one another between a furthest spaced apart position in which the parallelogram is collapsed and the links stored within the housing and a closest together position in which the links are extended from the housing and the parallelogram is opened to define a receptacle for receiving the beverage container and holding the container on the planar surface; and spring means acting between the inner ends of the first and second projection links and acting to urge the inner ends to their closest together position so that the links are held extended from the housing;

and upon movement of the linkage to the retracted position stored within the housing against the bias of the spring means the pivotal connection between the first and second connector links going overcenter with respect to the pivotal connection between the connector links and the projection links so that the bias of the spring means urging the projection link inner ends together acts through the links to urge the pivotal connection between the connector links toward the retracted position whereby the retractable beverage container holder is retained in the retracted position.

* * * * *